United States Patent
Hara et al.

(10) Patent No.: US 8,559,777 B2
(45) Date of Patent: Oct. 15, 2013

(54) OPTICAL DEVICE AND OPTICAL MODULATION APPARATUS

(75) Inventors: Hideo Hara, Miyagi (JP); Shin Masuda, Miyagi (JP); Atsushi Seki, Miyagi (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 13/278,154

(22) Filed: Oct. 20, 2011

(65) Prior Publication Data

US 2012/0328227 A1 Dec. 27, 2012

(30) Foreign Application Priority Data

Jun. 24, 2011 (JP) ................................. 2011-140860

(51) Int. Cl.
*G02F 1/035* (2006.01)
(52) U.S. Cl.
USPC ............................................. 385/40; 359/24
(58) Field of Classification Search
CPC ....................................................... G02F 1/225
USPC ............................................. 385/40; 359/254
See application file for complete search history.

(56) References Cited

U.S. PATENT DOCUMENTS

| | | | | |
|---|---|---|---|---|
| 4,917,449 A * | 4/1990 | Granestrand | ................. | 385/41 |
| 6,522,793 B1 * | 2/2003 | Szilagyi et al. | ................. | 385/2 |
| 6,646,776 B1 * | 11/2003 | Cheung et al. | ................. | 359/254 |
| 7,224,878 B1 * | 5/2007 | Wessels et al. | ................. | 385/130 |
| 2002/0071622 A1 * | 6/2002 | Betts et al. | ................. | 385/2 |
| 2002/0159738 A1 * | 10/2002 | Aoki et al. | ................. | 385/129 |
| 2002/0167711 A1 * | 11/2002 | Nespola et al. | ................. | 359/245 |
| 2003/0002766 A1 * | 1/2003 | Pruneri et al. | ................. | 385/2 |
| 2005/0226547 A1 * | 10/2005 | Ridgway | ................. | 385/2 |
| 2008/0069491 A1 * | 3/2008 | Kissa et al. | ................. | 385/2 |
| 2008/0170821 A1 * | 7/2008 | Kissa et al. | ................. | 385/14 |

FOREIGN PATENT DOCUMENTS

JP 2006-58837 A 3/2006

OTHER PUBLICATIONS

"Notice of Office Action" issued by the Korean Intellectual Property Office for application No. 10-2011-0117755.

* cited by examiner

*Primary Examiner* — Charlie Peng
*Assistant Examiner* — Peter Radkowski

(57) ABSTRACT

Provided is an optical modulator that modulates input light with a high frequency and low half-wave voltage. An optical device comprises a substrate; a dielectric film that is formed on the substrate and includes a first optical waveguide and a second optical waveguide that run parallel to each other; an insulating film formed on the dielectric film; a coplanar line that is formed on the insulating film and includes a signal line arranged between the first optical waveguide and the second optical waveguide, a first ground line arranged in a first region, and a second ground line arranged in a second region; and auxiliary electrodes that are arranged in the first region and the second region, are formed in contact with the dielectric film or within the insulating film, and apply bias voltages to the first optical waveguide and the second optical waveguide.

16 Claims, 8 Drawing Sheets ically fieldUS 8,559,777 B2

OPTICAL DEVICE AND OPTICAL MODULATION APPARATUS

BACKGROUND

1. Technical Field

The present invention relates to an optical device and an optical modulation apparatus.

2. Related Art

A Mach-Zehnder optical device is known that uses a lead lanthanum titanium zirconium oxide (a PbLaZrTiO-type complex oxide, shortened hereinafter to "PLZT") crystal, in which the change in refractive index with respect to applied electric field strength differs from that of $LiNbO_3$ (LN), as shown in Patent Document 1, for example. In order to achieve high-speed operation with such an optical device, one known technique includes forming an insulating film of $SiO_2$ on the PLZT crystal and then forming an electrode.

Patent Document 1: Japanese Patent Application Publication No. 2006-58837

However, when such an insulating film is formed between the electrode and the PLZT crystal, the distance between the electrodes and the PLZT crystal increases. As a result, the electric field generated according to the voltage applied to the electrode does not effectively reach the waveguide formed by the PLZT crystal. Accordingly, the strength of the electric field applied to the waveguide is decreased relative to the applied voltage. Therefore, when the Mach-Zehnder optical device is used as an optical modulator, the $V\pi$ voltage, which is the applied voltage necessary to shift the phase of the input light by half a wavelength, has a high voltage value.

SUMMARY

Therefore, it is an object of an aspect of the innovations herein to provide an optical device and an optical modulation apparatus, which are capable of overcoming the above drawbacks accompanying the related art. The above and other objects can be achieved by combinations described in the independent claims. The dependent claims define further advantageous and exemplary combinations of the innovations herein. According to a first aspect related to the innovations herein, provided is an optical device comprising a substrate; a dielectric film that is formed on the substrate and includes a first optical waveguide and a second optical waveguide that run parallel to each other; an insulating film formed on the dielectric film; a coplanar line that is formed on the insulating film and includes a signal line arranged between the first optical waveguide and the second optical waveguide, a first ground line arranged in a first region on a side of the first optical waveguide opposite the second optical waveguide, and a second ground line arranged in a second region on a side of the second optical waveguide opposite the first optical waveguide; and auxiliary electrodes that are arranged in the first region and the second region, are formed in contact with the dielectric film or within the insulating film, and apply bias voltages to the first optical waveguide and the second optical waveguide.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
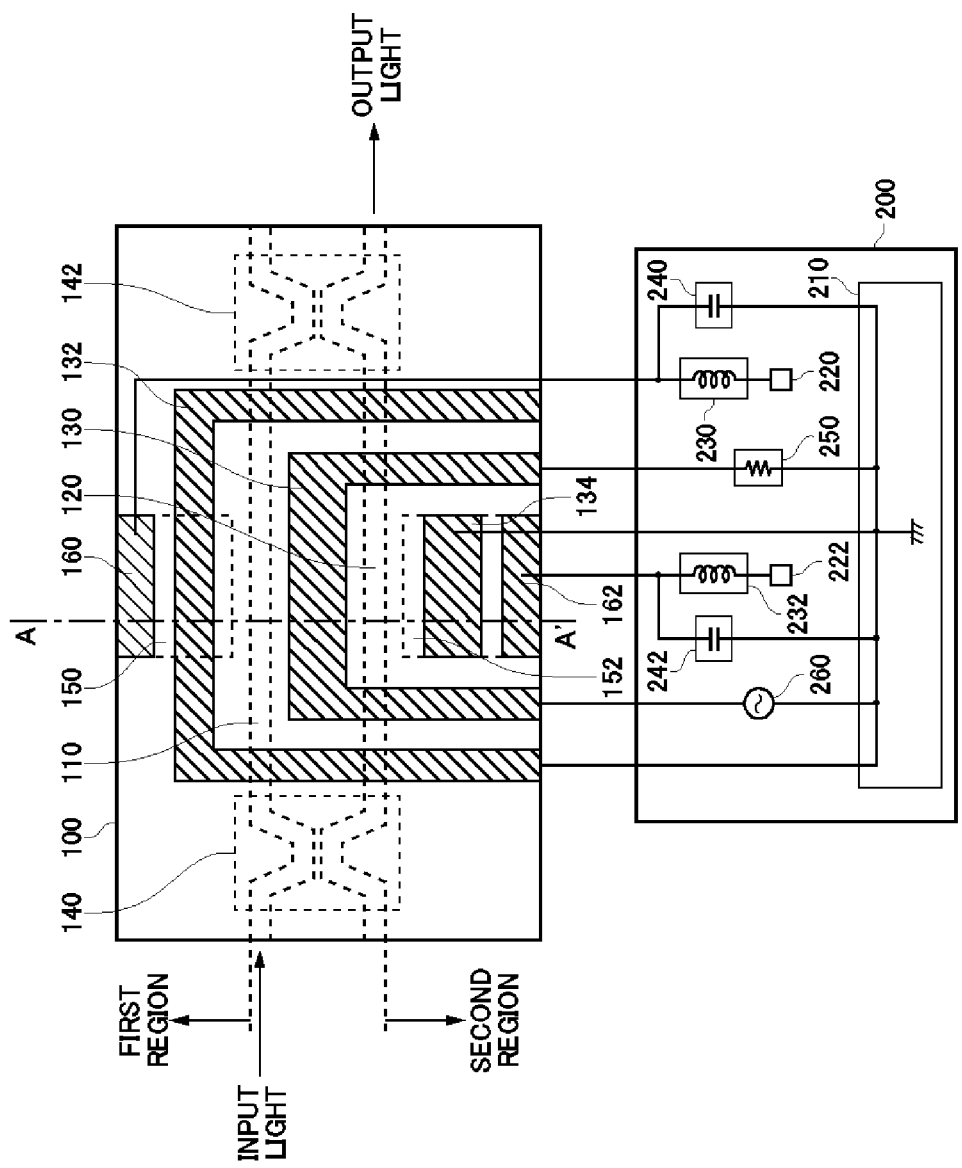
FIG. 1 shows an exemplary configuration of an optical device section 100 according to the present embodiment, along with a drive circuit section 200.

FIG. 1 shows an exemplary configuration of an optical device section 100 according to the present embodiment, along with a drive circuit section 200. The optical device section 100 includes a Mach-Zehnder optical waveguide formed by a ferroelectric crystal, a coplanar electrode that has a signal line and two bias applying electrodes sandwiching the signal line, and an insulating film formed between the dielectric film and the coplanar electrode. The optical device section 100 efficiently applies a modulated electric field to the Mach-Zehnder optical waveguide using auxiliary electrodes that are formed within the insulating film or on a ferroelectric thin film.

The optical device section 100 includes a first optical waveguide 110, a second optical waveguide 120, a signal line 130, a first ground line 132, a second ground line 134, a first photocoupler 140, a second photocoupler 142, a first auxiliary electrode 150, a second auxiliary electrode 152, a first external electrode 160, and a second external electrode 162.

The first optical waveguide 110 and the second optical waveguide 120 have a ridge structure in which a cross section of a dielectric material is convex, and transmit light input thereto. The first optical waveguide 110 and the second optical waveguide 120 may be formed to have a convex shape with a height and width corresponding to the wavelength of light transmitted thereby.

The signal line 130 is arranged between the first optical waveguide 110 and the second optical waveguide 120. One end of the signal line 130 is connected to the frequency signal source 260, the other end of the signal line 130 is connected to the termination resistance 250, and the signal line 130 transmits a frequency signal input to one end thereof to the other.

The first ground line 132 is arranged in a first region on the side of the first optical waveguide 110 opposite the second optical waveguide 120 and the signal line 130. The first ground line 132 is connected to the reference voltage 210. The second ground line 134 is arranged in a second region that is on the side of the second optical waveguide 120 opposite the first optical waveguide 110 and the signal line 130. The second ground line 134 is connected to the reference voltage 210.

The signal line 130, the first ground line 132, and the second ground line 134 form a coplanar transmission line. In other words, the line width of the signal line 130, the interval between the signal line 130 and the first ground line 132, and the interval between the signal line 130 and the second ground line 134 are set to predetermined values according to the characteristic impedance of the signal line 130. As a result, the signal line 130 can transmit a signal with a high frequency up to tens of GHz.

The first photocoupler 140 branches the light input to the optical device section 100, and guides the light to the first optical waveguide 110 and the second optical waveguide 120. The second photocoupler 142 multiplexes the light from the first optical waveguide 110 and the second optical waveguide 120. The second photocoupler 142 outputs the multiplexed light as the output light of the optical device section 100.

The first photocoupler 140 and the second photocoupler 142 may each be a 3 dB photocoupler with two inputs and two outputs that branches, in a one-to-one manner, light input thereto from either of two input sections and outputs the light from each of the two output sections. Instead, the first photocoupler 140 may be an optical branching coupler with one input and two outputs and the second photocoupler 142 may be an optical multiplexing coupler with two inputs and one output. The first photocoupler 140 and the second photocoupler 142 may each be a multimode interferometer (MMI) coupler.

Here, the first optical waveguide 110, the second optical waveguide 120, the first photocoupler 140, and the second photocoupler 142 form a Mach-Zehnder optical waveguide. In other words, the optical device section 100 branches input light into two beams with the first photocoupler 140, transmits the two beams respectively to the first optical waveguide 110 and the second optical waveguide 120, multiplexes the two beams with the second photocoupler 142, and outputs the multiplexed light. The optical device section 100 modulates the phase of the light being transmitted, by applying an electric field to the first optical waveguide 110 and the second optical waveguide 120 according to a signal applied to the coplanar transmission path from the drive circuit section 200, and multiplexes the light with the second photocoupler 142, to output light that is intensity-modulated according to a phase difference.

The first auxiliary electrode 150 applies a bias voltage to the first optical waveguide 110. The first external electrode 160 is formed on the surface of the optical device section 100, and is electrically connected to the first auxiliary electrode 150 to supply the first auxiliary electrode 150 with a bias voltage from the drive circuit section 200.

The second auxiliary electrode 152 applies a bias voltage to the second optical waveguide 120. The second external electrode 162 is formed on the surface of the optical device section 100, and is electrically connected to the second auxiliary electrode 152 to supply the second auxiliary electrode 152 with a bias voltage from the drive circuit section 200.

The drive circuit section 200 applies a first bias voltage and a second bias voltage, which are different from each other, to the first auxiliary electrode 150 and the second auxiliary electrode 152, and applies a control voltage that is between the first bias voltage and the second bias voltage to the signal line 130. The drive circuit section 200 includes a reference voltage 210, a first power supply section 220, a second power supply section 222, a first inductor 230, a second inductor 232, a first capacitor 240, a second capacitor 242, a termination resistance 250, and a frequency signal source 260.

The reference voltage 210 supplies a predetermined voltage. In the present embodiment, the reference voltage 210 supplies a GND voltage of 0 V.

The first power supply section 220 supplies the first auxiliary electrode 150 with the first bias voltage, via the first inductor 230 and the first external electrode 160. The first inductor 230 is connected between the first external electrode 160 and the first power supply section 220 outputting the first bias voltage.

The second power supply section 222 supplies the second auxiliary electrode 152 with the second bias voltage, via the second inductor 232 and the second external electrode 162. The second inductor 232 is connected between the second external electrode 162 and the second power supply section 222 outputting the second bias voltage.

The first capacitor 240 is connected between the reference voltage 210 and the first external electrode 160. As a result, for the high frequency component, the first external electrode 160 is connected to the GND voltage, which is the reference voltage, with a low resistance, while the DC component is blocked.

The second capacitor 242 is connected between the reference voltage 210 and the second external electrode 162. As a result, for the high frequency component, the second external electrode 162 is connected to the GND voltage, which is the reference voltage, with a low resistance, while the DC component is blocked.

The termination resistance 250 is the termination of the signal line 130. For example, the signal line 130 may be a transmission line with a characteristic impedance of 50Ω and the resistance value of the termination resistance 250 may be 50 Ω.

The frequency signal source 260 supplies the signal line 130 with a control signal that is a frequency signal having a predetermined frequency. The frequency signal source 260 may supply a frequency signal with a frequency up to tens of GHz.

In the manner described above, the first ground line 132 and the second ground line 134 are connected to the GND voltage, and the signal line 130 has one end that is a termination and another end from which a high frequency signal is supplied. In other words, the signal line 130, the first ground line 132, and the second ground line 134 function as a coplanar transmission path.

Figure 2:
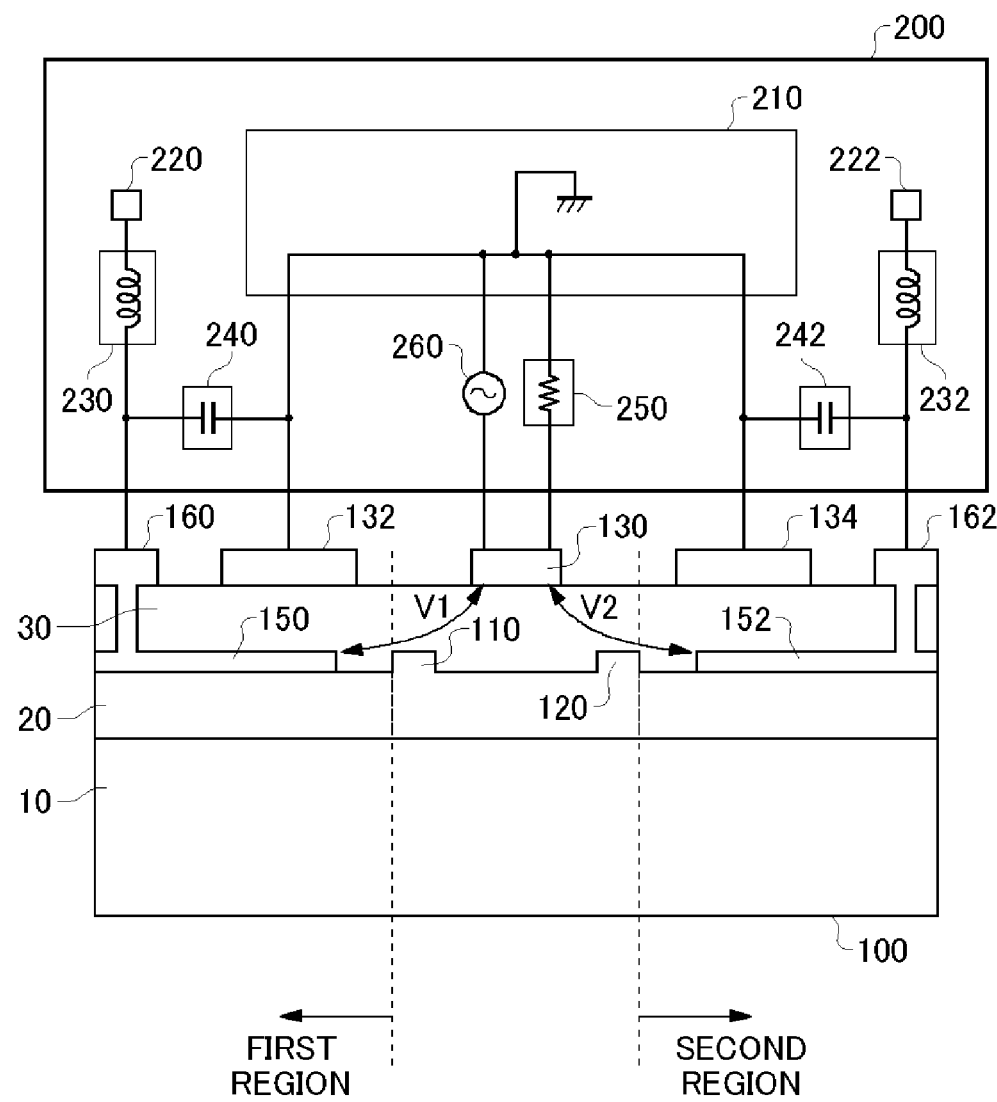
FIG. 2 shows a cross section over the line A-A' in FIG. 1, along with the drive circuit section 200.

FIG. 2 shows a cross section over the line A-A' in FIG. 1, along with the drive circuit section 200. In FIG. 2, components that are substantially the same as those in the optical device section 100 and the drive circuit section 200 according to the present embodiment shown in FIG. 1 are given the same reference numerals, and descriptions thereof are omitted. The optical device section 100 includes a substrate 10, a dielectric film 20, and an insulating film 30.

The substrate 10 is formed of a single-crystal material. For example, the substrate 10 may be an $Al_2O_3$ (sapphire) substrate or a MgO substrate. The substrate 10 may be a so-called R-cut sapphire substrate obtained by cutting and polishing such that the (1102) plane of a sapphire substrate is the primary surface.

Instead, the substrate 10 may be formed by layering some type of layers on a substrate. In other words, since the dielectric film 20 is deposited on the surface of the substrate 10, the substrate 10 may include a buffer layer for preventing scattering of the substrate material to the dielectric film 20 and/or for lattice matching with the dielectric film 20.

The dielectric film 20 is formed on the substrate 10 and includes the first optical waveguide 110 and the second optical waveguide 120 running parallel to each other. The dielectric film 20 includes the first photocoupler 140 and the second photocoupler 142 connected respectively to the first optical waveguide 110 and the second optical waveguide 120.

The dielectric film 20 is a ferroelectric thin film. The dielectric film 20 may be formed using epitaxial growth. The dielectric film 20 may be a thin film with a thickness of 10 μm or less, for example. The dielectric film 20 may form a core material of an optical waveguide that transmits light having a wavelength used in 850 nm band, 1300 nm band, and 1500 nm band optical communication. The dielectric film 20 may have a thickness that is determined based on the wavelength of the light to be transmitted.

The dielectric film 20 is a ferroelectric thin film such as a PZT thin film, a PLZT thin film, or a $BaTiO_3$ thin film. A PLZT crystal, a PZT crystal, and a $BaTiO_3$ crystal, for example, are ferroelectric crystals having a Perovskite structure, which is one type of crystal structure, that changes to a tetragonal crystal, an orthorhombic crystal, a rhombohedral crystal, or a cubic crystal depending on temperature and material composition. However, when PLZT crystals or the like are deposited and grown on a certain substrate, the lattice constant of the substrate material differs from the lattice constant of the bulk single crystal substrate, and therefore the crystal structure can change when stress is applied to the thin film.

For example, when a PLZT thin film is formed as the dielectric film 20 on a sapphire (1102) substrate, the PLZT thin film has a preferred orientation in the <110> direction. In this way, when the dielectric film 20 is formed as a crystal with a suitable structure on a substrate 10 selected to have a suitable crystal orientation direction, the crystal becomes oriented parallel to the surface of the substrate 10, and therefore the direction of the intrinsic polarization can be made parallel to the surface of the substrate 10. As a result, the optical device section 100 can provide a substrate suitable for a device that applies an electric field parallel to the easy axis of polarization of the PLZT thin film.

The insulating film 30 is formed on the dielectric film 20. The insulating film 30 may include $SiO_2$ or $SiN_x$. The insulating film 30 may be a low-dielectric-constant film that has a lower dielectric constant than the dielectric film 20. The substrate 10 may also have a lower dielectric constant than the dielectric film 20. For example, the insulating film 30 and the substrate 10 may each have a dielectric constant of 10 or less, and the dielectric film 20 may have a dielectric constant that is from several hundred to several thousand.

As a result, the dielectric film 20 having a high dielectric constant is formed between the substrate 10 and the insulating film 30 having low dielectric constants and low refractive indexes, thereby forming the first optical waveguide 110 and the second optical waveguide 120 that can efficiently capture light. Furthermore, when a modulated signal is supplied to the optical device section 100 and the optical device section 100 is used as a modulator, the optical device section 100 can perform speed matching of matching the transmission speed of the modulated signal to the transmission speed of a light wave transmitted through the first optical waveguide 110 and the second optical waveguide 120, by changing the thickness and material of the substrate 10 and the insulating film 30 to obtain an effective dielectric constant. Furthermore, the substrate 10 and the insulating film 30 can set the characteristic impedance of the transmission line on which the modulated signal is transmitted to be a predetermined value such as 50Ω, for example.

The coplanar transmission line including the signal line 130, the first ground line 132, and the second ground line 134 is formed on the insulating film. The transmission line may be formed of metal, including gold.

The first auxiliary electrode 150 is formed in the first region in contact with the dielectric film 20 or within the insulating film 30, and applies a bias voltage to the first optical waveguide 110. The first auxiliary electrode 150 may be provided closer to the first optical waveguide 110 than the first ground line 132.

The second auxiliary electrode 152 is formed in the second region in contact with the dielectric film 20 or within the insulating film 30, and applies a bias voltage to the second optical waveguide 120. The second auxiliary electrode 152 may be provided closer to the second optical waveguide 120 than the second ground line 134. In FIGS. 1 and 2, the first auxiliary electrode 150 and the second auxiliary electrode 152 are formed on the dielectric film 20. Furthermore, the first external electrode 160 and the second external electrode 162 are formed on the insulating film 30.

Here, a conventional optical device applies a bias voltage to the first ground line 132 and/or the second ground line 134 of the coplanar transmission line to apply an electric field to the first optical waveguide 110 and/or the second optical waveguide 120. For example, the signal line 130 and the first ground line 132 apply an electric field to the first optical waveguide 110, and the signal line 130 and the second ground line 134 apply an electric field to the second optical waveguide 120.

In a conventional optical device, in order to decrease loss caused by a mismatch between the transmission speed of a signal transmitted on the signal line 130 and the transmission speed of a light wave transmitted in the optical waveguides and/or loss caused by a dielectric dissipation factor that causes the dielectric film 20 to be unable to track the polarity of a high frequency, the thickness of the insulating film 30 is set to be greater than or equal to 1 μm and a frequency signal with a frequency greater than or equal to approximately 1 GHz is transmitted on the signal line 130, for example. However, when the thickness of the insulating film 30 is approximately 1 μm or more, the interval between the signal line 130 and each of the first optical waveguide 110 and second optical waveguide 120 increases according to the thickness of the insulating film 30, and so the electric field strength applied to the first optical waveguide 110 and the second optical waveguide 120 is decreased.

Accordingly, such a conventional optical device increases the bias voltage and/or the voltage applied to the signal line 130 according to the increased thickness of the insulating film 30, to adjust the strength of the electric fields applied to the first optical waveguide 110 and the second optical waveguide 120. For example, if the optical device uses an optical modulator, a Vπ voltage, which is the voltage that must be applied to modulate the input light by half a period, is increased according to the thickness of the insulating film 30. Furthermore, when the bias voltage is increased in order to minimize the Vπ voltage, the bias voltage can exceed 140 V.

In contrast to the above, the signal line 130 and the first auxiliary electrode 150 in the optical device section 100 of the present embodiment apply an electric field corresponding to the inter-electrode voltage shown by V1 in FIG. 2 to the first optical waveguide 110, and the signal line 130 and the second auxiliary electrode 152 apply an electric field corresponding to the inter-electrode voltage shown by V2 in FIG. 2 to the second optical waveguide 120. In other words, the optical device section 100 does not apply the leaked electric field of the electric field between the electrodes formed on the insulating film 30 to the optical waveguides, and instead generates an electric field between the electrodes formed on the dielectric film 20 and the electrodes formed on the insulating film 30 and applies this electric field more directly to the optical waveguides. Therefore, the optical device section 100 can include the insulating film 30 with a thickness of approximately 1 μm or more while preventing a decrease in the strength of the electric fields applied to the first optical waveguide 110 and the second optical waveguide 120.

Figure 3:
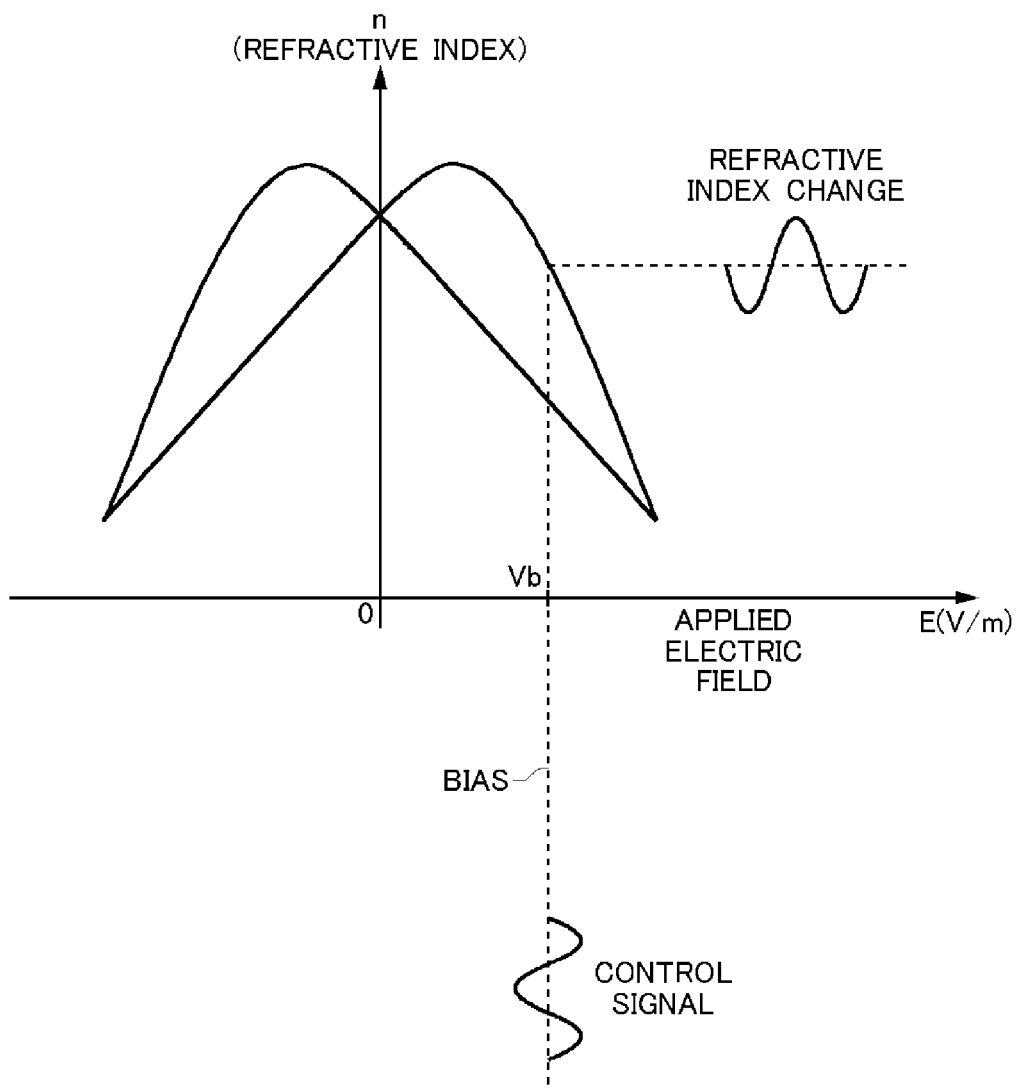
FIG. 3 shows exemplary change in the refractive index with respect to the applied electric field of the dielectric film 20 according to the present embodiment.

FIG. 3 shows exemplary change in the refractive index with respect to the applied electric field of the dielectric film 20 according to the present embodiment. In FIG. 3, the horizontal axis indicates the strength of the applied electrical field generated according to the voltage applied to the dielectric film 20, and the vertical axis indicates change of the refractive index relative to the applied electric field of the dielectric film 20.

The dielectric film 20, which is formed of PLZT crystal, PZT crystal, or $BaTiO_3$ crystal, for example, exhibits polarization inversion according to the applied electric field, and therefore, unlike $LiNbO_3$ crystal or the like in which the change in refractive index is linear with respect to the applied electric field, the dielectric film 20 exhibits a complicated refractive index change, such as a butterfly shape, with respect to the applied electric field. Accordingly, when a sinusoidal voltage is applied to the dielectric film 20 as the control signal, the change in the refractive index is distorted from the form of a sinusoidal wave, unless an offset voltage is added. Here, a dielectric film that has intrinsic polarization and polarity that inverts with respect to the applied electric field is referred to as a "ferroelectric film."

On the other hand, when LN crystal or the like that exhibits linear refractive index change in a positive and negative applied electric field range is used as an optical modulator by forming a Mach-Zehnder optical waveguide, there is a known method for modulation that includes forming a coplanar transmission line that includes ground (G), signal (S), and ground (G) electrodes. With such an LN optical modulator, the S electrode is arranged between the two optical waveguides running parallel in the Mach-Zehnder optical waveguide to apply a control signal, and the two parallel optical waveguides respectively have electric fields in opposite directions applied thereto. In other words, the light beams passed through the two parallel optical waveguides have their phases changed in opposite directions, thereby achieving the optical modulation.

However, as shown in FIG. 3, for a ferroelectric such as PLZT, the slope of the refractive index in a positive applied electric field range and the slope of the refractive index in a negative applied electric field range change in almost the same manner, with respect to change in the absolute value of the applied electric field strength. An optical device using such a ferroelectric causes electric fields having the same direction to be applied to the two parallel optical waveguides when the optical device is used in a GSG coplanar transmission line in the same manner as the LN optical modulator. In other words, the light beams passed by the two parallel optical waveguides each undergo a phase change in the same direction, and so there is no phase difference therebetween. Therefore, the optical device using a ferroelectric such as PLZT exhibits unreliable operation when used as an optical modulator or an optical switch, or cannot achieve such operation at all.

In contrast, the drive circuit section 200 of the present embodiment adds a bias voltage $V_b$, which is an offset voltage, to the control signal and applies the resulting signal to the dielectric film 20. The bias voltage $V_b$ may be determined in advance such that, even if the bias voltage is increased or decreased by the voltage amplitude of the control signal, the refractive index change of the dielectric film 20 remains almost linear. For example, when the voltage amplitude of the control signal is 20 V, $V_b$ is set to 100 V such that the refractive index change of the dielectric film 20 is approximately linear in a range from 80 V to 120 V.

By applying the bias voltage $V_b$ in this way, the dielectric film 20 can exhibit a refractive index change characteristic that resembles the applied control signal. The dielectric film 20 shown in the example of FIG. 3 exhibits a refractive index change with a negative slope relative to the applied electric field, and therefore the phase inverts with respect to a sinusoidal control signal applied to the dielectric film 20.

Figure 4:
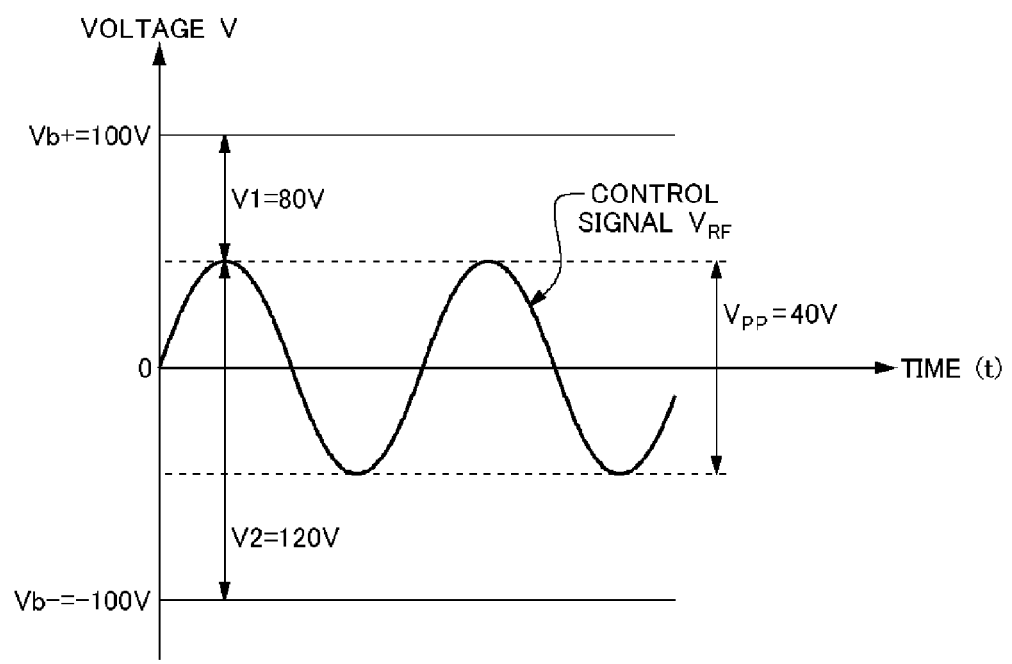
FIG. 4 shows an exemplary drive voltage VRF of the drive circuit section 200 according to the present embodiment.

FIG. 4 shows an exemplary drive voltage VRF of the drive circuit section 200 according to the present embodiment. In FIG. 4, the horizontal axis indicates time and the vertical axis indicates voltage. The first auxiliary electrode 150 provided in the first region is an electrode to which a positive bias is applied, and the second auxiliary electrode 152 in the second region is an electrode to which a negative bias is applied.

As an example, the first power supply section 220 supplies the first auxiliary electrode 150 with $V_{b+}$ of 100 V as a first bias voltage, and the second power supply section 222 supplies the second auxiliary electrode 152 with $V_{b-}$ of −100 V as a second bias voltage. The frequency signal source 260 applies to the signal line 130 a sinusoidal signal $V_{RF}$ with an amplitude of 20 V, which is a control signal between the first bias voltage $V_{b+}$ and the second bias voltage $V_{b-}$.

Accordingly, an electric field corresponding to the inter-electrode voltage $V_1$ (=$V_{b+}-V_{RF}$), which is between the first auxiliary electrode 150 to which the first bias voltage $V_{b+}$ is applied and the signal line 130 to which the sinusoidal signal $V_{RF}$ is applied, is applied to the first optical waveguide 110. Similarly, an electric field corresponding to the inter-electrode voltage $V_2$ (=$V_{RF}-V_{b-}$), which is between the second auxiliary electrode 152 to which the second bias voltage $V_{b-}$ is applied and the signal line 130 to which the sinusoidal signal $V_{RF}$ is applied, is applied to the second optical waveguide 120.

Figure 5:
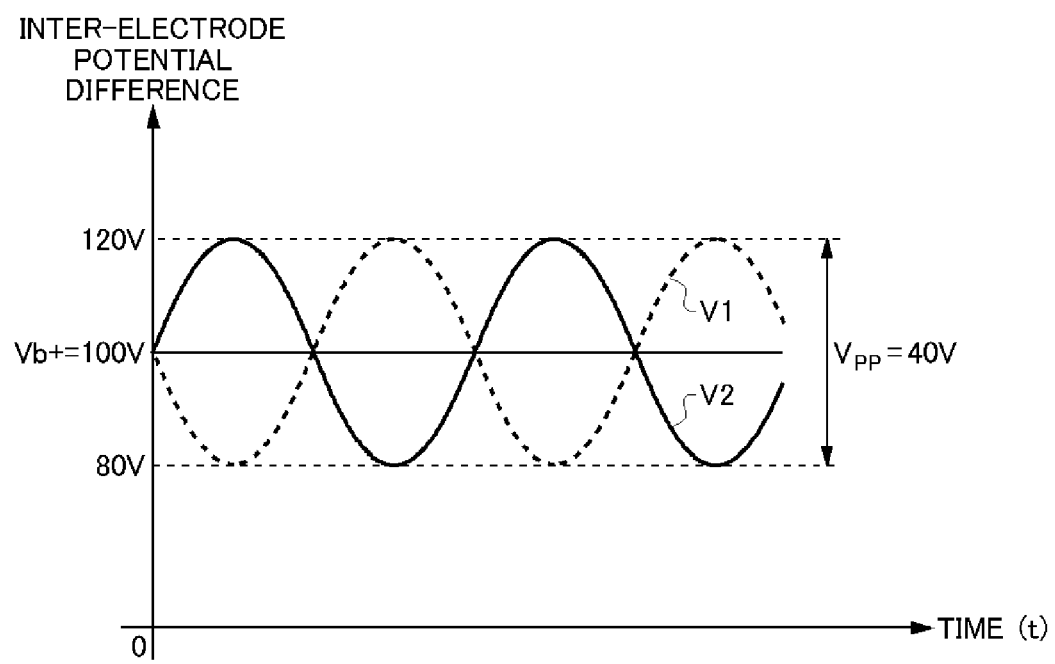
FIG. 5 shows an exemplary inter-electrode voltage of the optical device section 100 according to the present embodiment.

FIG. 5 shows an exemplary inter-electrode voltage of the optical device section 100 according to the present embodiment. In FIG. 5, the horizontal axis indicates time and the vertical axis indicates voltage. The inter-electrode voltage $V_1$ (=$V_{b+}-V_{RF}$) has a waveform of a sinusoidal signal obtained by inverting, by 180 degrees, a sinusoidal signal whose amplitude increases or decreases by 20 V from a central point of $V_{b+}$ (100 V). Furthermore, the inter-electrode voltage $V_2$ (=$V_{RF}-V_{b-}$) has a waveform of a sinusoidal signal whose amplitude increases or decreases by 20 V from a central point of $-V_{b-}$, which is equal to $V_{b+}$ (100 V).

In other words, the drive circuit section 200 can apply electric fields with inverse phases respectively to the first optical waveguide 110 and the second optical waveguide 120 of the optical device section 100. In this way, by performing push-pull driving of the first optical waveguide 110 and the second optical waveguide 120, the drive circuit section 200 can cause the phase difference between the two beams of light transmitted respectively on the two optical waveguides to be approximately double the phase difference achieved by one-sided driving in which an electric field is applied to only one of the first optical waveguide 110 and the second optical waveguide 120.

In this way, by using a control signal from one frequency signal source 260, the drive circuit section 200 can perform push-pull driving of the first optical waveguide 110 and the second optical waveguide 120 formed of PLZT, for example, to efficiently apply the electric fields. As a result, the optical device section 100 and the drive circuit section 200 can perform optical modulation without using a plurality of bias tees, additional circuits, or differential signal drivers, for example.

For a Mach-Zehnder optical device that uses a PLZT crystal or the like having a refractive index that changes in a complicated manner with respect to the applied electric field strength, the optical device section 100 and the drive circuit section 200 of the present embodiment described above can form coplanar electrodes and transmit a high-speed control signal to apply electric fields with inverse phases respectively to two optical waveguides, according to a control signal. As a result, the optical device section 100 can operate as an optical modulator that tracks a control signal having a frequency of tens of GHz.

The optical device section 100 includes the insulating film 30 and can efficiently apply electric fields to the first optical waveguide 110 and the second optical waveguide 120 while causing the transmission speed of the modulated signal and the transmission speed of the light waves transmitted on the first optical waveguide 110 and the second optical waveguide 120 to match each other, thereby preventing an increase in the Vπ voltage.

Figure 6:
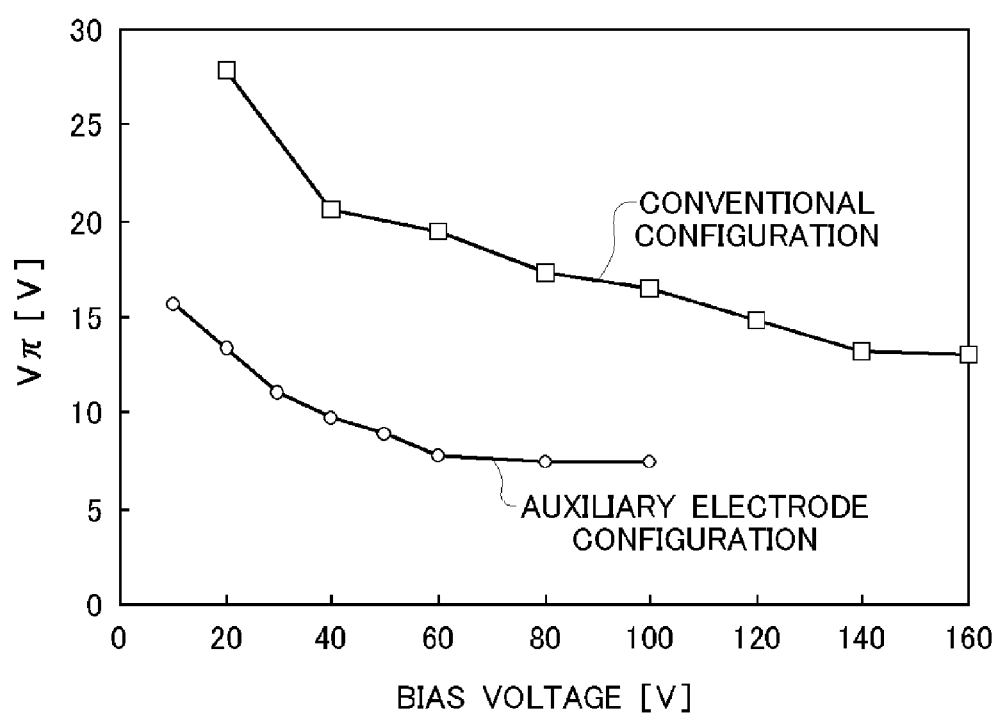
FIG. 6 shows an exemplary relationship between the $V\pi$ voltage and the bias voltage of the optical device section 100 according to the present embodiment.

FIG. 6 shows an exemplary relationship between the Vπ voltage and the bias voltage of the optical device section 100 according to the present embodiment. In FIG. 6, the horizontal axis indicates the absolute value of the bias voltage ($=V_{b+}=-V_{b-}$) and the vertical axis represents an example of actual measured values of the Vπ voltage corresponding to the bias voltage.

In FIG. 6, the square marks indicate results obtained for the Vπ voltage in a conventional configuration, where the bias voltage is applied to the first ground line 132 and the second ground line 134 of the coplanar transmission line. Furthermore, the circle marks indicate results obtained for the Vπ voltage in a configuration where the bias voltage is applied to the auxiliary electrodes of the present embodiment. Here, the insulating film 30 was an $SiO_2$ film of 1 μm, and the coplanar electrode has a signal line 130 electrode width of 7 μm, an electrode interval of 11 μm, an electrode thickness of 7 μm, and an electrode length of 10 mm.

Based on the above results, it is understood that the optical device section 100 of the present embodiment can achieve the same Vπ as the conventional device while using a lower bias voltage, and can efficiently apply the bias voltage from the auxiliary electrodes to the optical waveguides. Furthermore, in the conventional configuration, Vπ was generally kept at a prescribed value by setting the bias voltage to be 140 V or more, but the optical device section 100 was able to keep Vπ at a constant value using a bias voltage of 60 V, which is less than half the bias voltage used in the conventional configuration.

Furthermore, as an example, Vπ=14 V at a bias voltage of 140 V in the conventional configuration, but the optical device section 100 can obtain the same Vπ with a bias voltage of approximately 20 V, thereby indicating that the optical device section 100 requires approximately 1/7 the bias voltage of the conventional configuration. In this way, the optical device section 100 of the present embodiment can realize an optical amplifier that modulates input light with a higher frequency or a lower half-wave voltage Vπ than the conventional configuration.

Figure 7:
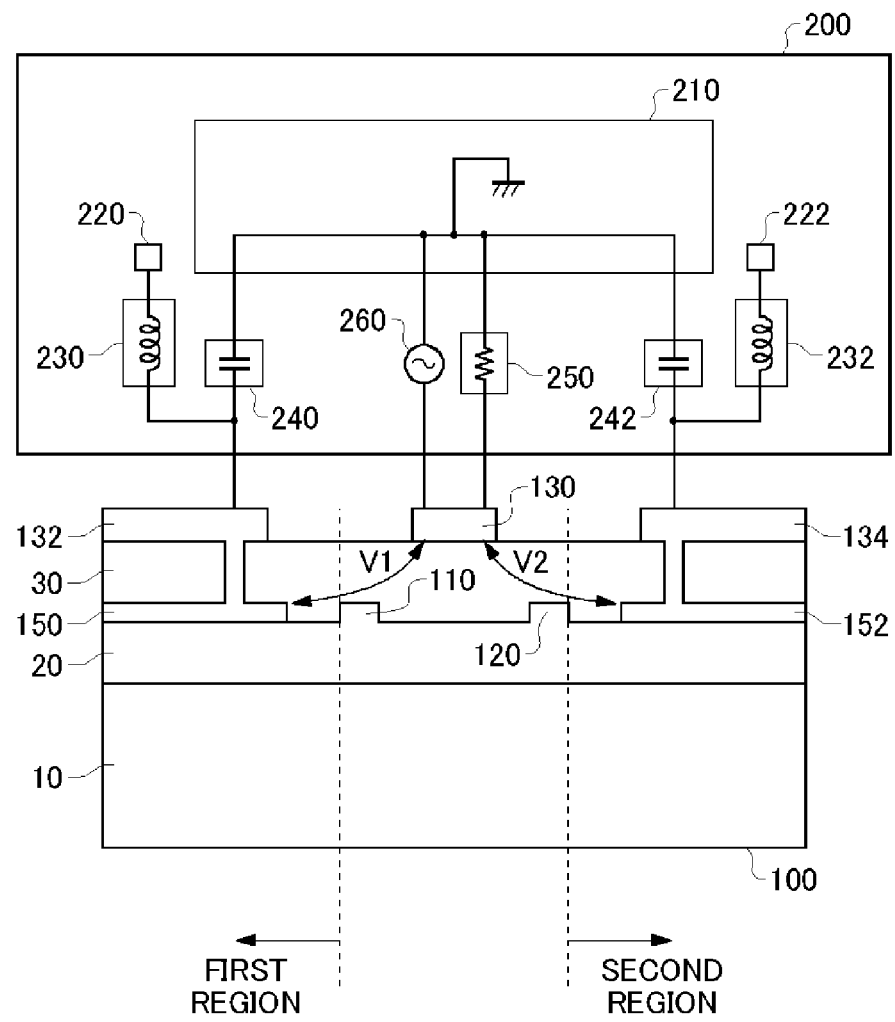
FIG. 7 shows a first modification of the optical device section 100 according to the present embodiment, along with the drive circuit section 200.

FIG. 7 shows a first modification of the optical device section 100 according to the present embodiment, along with the drive circuit section 200. In FIG. 7, components that are substantially the same as those of the optical device section 100 and the drive circuit section 200 described in FIGS. 1 and 2 are given the same reference numerals, and descriptions thereof are omitted.

In the present modification, the first auxiliary electrode 150 in the first region is connected to the first ground line 132. The first ground line 132 is connected to the predetermined reference voltage 210 via the first capacitor 240. The first ground line 132 is also connected to the first power supply section 220 via the first inductor 230.

The second auxiliary electrode 152 in the second region is connected to the second ground line 134. The second ground line 134 is connected to the predetermined reference voltage 210 via the second capacitor 242. The second ground line 134 is also connected to the second power supply section 222 via the second inductor 232.

In this way, in the present embodiment, the first ground line 132 and the second ground line 134 are connected to the GND voltage with a high frequency while being supplied respectively with the first bias voltage and the second bias voltage. One end of the signal line 130 is a termination end, and the other end is supplied with a high-frequency signal. In other words, the signal line 130, the first ground line 132, and the second ground line 134 function as a coplanar transmission path at the drive frequency supplied by the frequency signal source 260.

In the present modification as well, the optical device section 100 generates an electric field between the electrodes formed on the insulating film 30 and the electrodes formed on the dielectric film 20, to more directly apply the generated electric field to the optical waveguides. As a result, the optical device section 100 can include the insulating film 30 with a thickness of approximately 1 μm or more while preventing a decrease in the strength of the electric fields applied to the first optical waveguide 110 and the second optical waveguide 120. Accordingly, the optical device section 100 of the present embodiment can realize an optical amplifier that modulates input light with a higher frequency or a lower half-wave voltage V1 than the conventional configuration.

The above embodiment describes an example in which the drive circuit section 200 includes a frequency signal source 260 and supplies a frequency signal having a predetermined frequency to the signal line 130. Instead, the drive circuit section 200 may include a pulse signal source or a switching circuit, for example, and supply the signal line 130 with a pulse signal or a switching control signal. In this way, the optical device section 100 can operate as an optical switch that switches whether input light is output, according to the pulse signal or the switching control signal.

Figure 8:
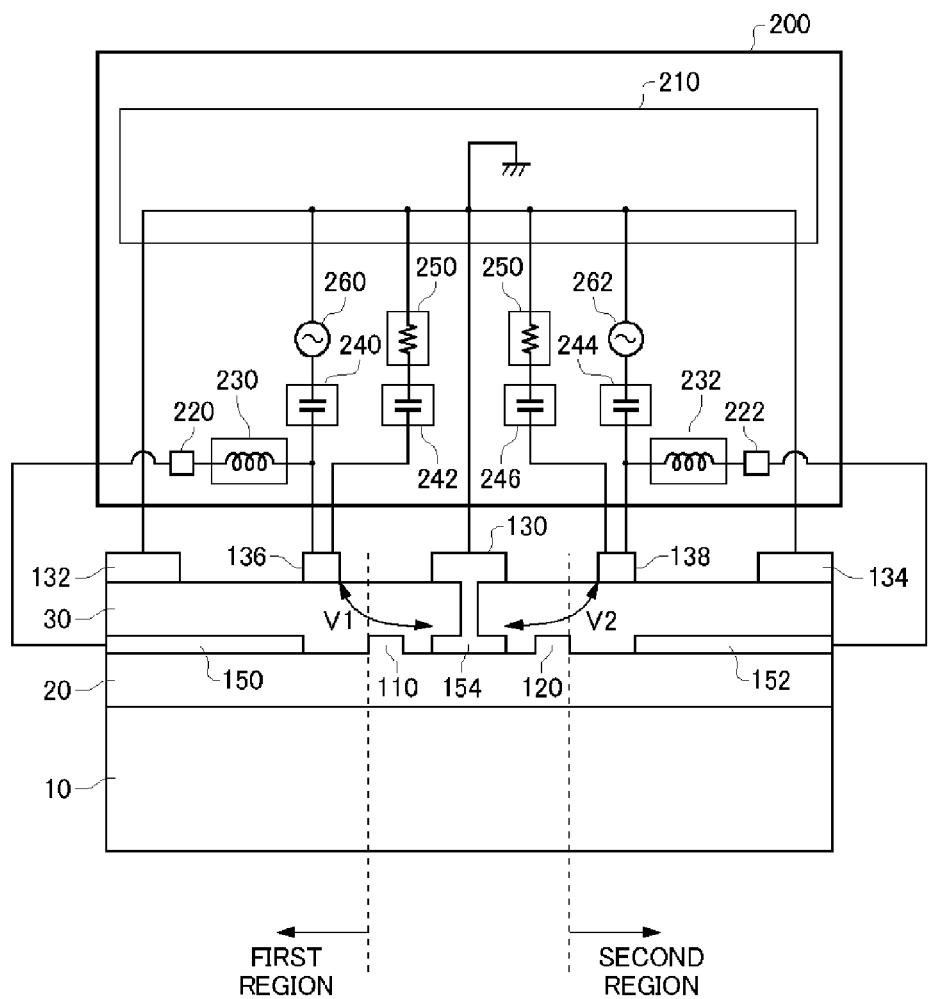
FIG. 8 shows a second modification of the optical device section 100 according to the present embodiment, along with the drive circuit section 200.

FIG. 8 shows a second modification of the optical device section 100 according to the present embodiment, along with the drive circuit section 200. In FIG. 8, components that are substantially the same as those of the optical device section 100 and the drive circuit section 200 described in FIGS. 1 and 2 are given the same reference numerals, and descriptions thereof are omitted. In the second modification, the optical device section 100 further includes a first differential signal line 136, a second differential signal line 138, a ground electrode 154, and an inverse-phase frequency signal source 262.

The first differential signal line 136 is formed on the insulating film 30 in the first region, between the signal line 130 and the first ground line 132. The second differential signal line 138 is formed on the insulating film 30 in the second region, between the signal line 130 and the second ground line 134.

The ground electrode 154 is provided between the first optical waveguide 110 and the second optical waveguide 120, either in contact with the dielectric film 20 or between the dielectric film 20 and the insulating film 30, and is connected to the predetermined reference voltage 210. The ground electrode 154 may be provided closer to the first optical waveguide 110 than the signal line 130. The ground electrode 154 may be provided closer to the second optical waveguide 120 than the signal line 130. The first differential signal line 136, the second differential signal line 138, and the ground electrode 154 may include gold.

The inverse-phase frequency signal source 262 outputs a frequency signal that has the same frequency as output by the frequency signal source 260 but a phase that is different by 180 degrees. The frequency signal source 260 and the inverse-phase frequency signal source 262 function as a differential signal source.

In the second modification, the first auxiliary electrode 150 is connected to the first power supply section 220. The second auxiliary electrode 152 is connected to the second power supply section 222. The first ground line 132 and the second ground line 134 are connected to the reference voltage 210. The signal line 130 is connected to the ground electrode 154 and to the reference voltage 210. In other words, in the second modification, the signal line 130 is an external ground electrode functioning as a ground line, in the same manner as the first ground line 132 and the second ground line 134.

The first differential signal line 136 is connected to the first power supply section 220 via the first inductor 230.

One end of the first differential signal line 136 is connected to the frequency signal source 260 via the first capacitor 240, and the other end is connected to the termination resistance 250 via the second capacitor 242. As a result, the first differential signal line 136 functions as a transmission line that transmits a frequency signal, received from the frequency signal source 260, from one end thereof to the other, while the first bias voltage is applied thereto from the first power supply section 220.

The second differential signal line 138 is connected to the second power supply section 222 via the second inductor 232.

One end of the second differential signal line 138 is connected to the inverse-phase frequency signal source 262 via the third capacitor 244, and the other end is connected to the termination resistance 250 via the fourth capacitor 246. As a result, the second differential signal line 138 functions as a transmission line that transmits a frequency signal, received from the inverse-phase frequency signal source 262, from one end thereof to the other, while the second bias voltage is applied thereto from the second power supply section 222.

In the manner described above, the optical device section 100 of the second modification can transmit a differential signal, to which is applied the first bias voltage and the second bias voltage supplied from the drive circuit section 200, on a coplanar transmission line formed by the signal line 130, the first ground line 132, the second ground line 134, the first differential signal line 136, and the second differential signal line 138. Therefore, the optical device section 100 applies to the first optical waveguide 110 an electric field corresponding to the inter-electrode voltage V1 between the first differential signal line 136 and the ground electrode 154. Similarly, the optical device section 100 applies to the second optical waveguide 120 an electric field corresponding to the inter-electrode voltage V2 between the second differential signal line 138 and the ground electrode 154.

In this way, the optical device section 100 can generate an electric field between the electrodes formed on the insulating film 30 and the electrodes formed on the dielectric film 20, to apply electric fields corresponding to a differential signal to the first optical waveguide 110 and the second optical waveguide 120. Therefore, the optical device section 100 can include the insulating film 30 with a thickness of approximately 1 μm or more while preventing a decrease in the electric field strength applied to the first optical waveguide 110 and the second optical waveguide 120.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An optical device comprising:
   a substrate;
   a dielectric film that is formed on the substrate and includes a first optical waveguide and a second optical waveguide that run parallel to each other;
   an insulating film formed on the dielectric film;
   a coplanar line that is formed on the insulating film and includes a signal line arranged between the first optical waveguide and the second optical waveguide, a first ground line arranged in a first region on a side of the first optical waveguide opposite the second optical waveguide, and a second ground line arranged in a second region on a side of the second optical waveguide opposite the first optical waveguide; and
   auxiliary electrodes that are arranged in the first region and the second region, are formed in contact with the dielectric film or within the insulating film, and apply bias voltages to the first optical waveguide and the second optical waveguide, wherein
   the auxiliary electrode arranged in the first region is an electrode to which a positive bias voltage is applied, and
   the auxiliary electrode arranged in the second region is an electrode to which a negative bias voltage is applied.

2. The optical device according to claim 1, wherein
   the auxiliary electrodes are arranged closer to the first optical waveguide and the second optical waveguide than the first ground line and the second ground line.

3. The optical device according to claim 1, wherein
   the dielectric film further includes:
      a first photocoupler that branches input light and guides the resulting light to the first optical waveguide and the second optical waveguide; and
      a second photocoupler that combines the light from the first optical waveguide and the second optical waveguide, and
   the first optical waveguide, the second optical waveguide, the first photocoupler, and the second photocoupler form a Mach-Zehnder optical waveguide.

4. The optical device according to claim 1, wherein
   the substrate is formed of a single-crystal material.

5. The optical device according to claim 4, wherein
   the substrate is a sapphire substrate or a MgO substrate.

6. The optical device according to claim 1, wherein
   the dielectric film is a ferroelectric thin film.

7. The optical device according to claim 6, wherein
the ferroelectric thin film is a PZT thin film, a PLZT thin film, or a BaTiO$_3$ thin film, which have Perovskite crystal structures.

8. The optical device according to claim 1, wherein the insulating film includes SiO$_2$ or SiN$_x$.

9. The optical device according to claim 1, wherein
the auxiliary electrode arranged in the first region is connected to the first ground line,
the auxiliary electrode arranged in the second region is connected to the second ground line, and
the first ground line and the second ground line are connected to a predetermined reference voltage via a capacitor.

10. The optical device of claim 1, further comprising a ground electrode that is arranged between the first optical waveguide and the second optical waveguide, formed either in contact with the dielectric film or between the dielectric film and the insulating film, and connected to a predetermined reference voltage.

11. The optical device of claim 10, wherein
the signal line of the coplanar line is connected to the ground electrode, and
the coplanar line further includes:
a first differential signal line formed on the insulating film in the first region, between the signal line and the first ground line; and
a second differential signal line formed on the insulating film in the second region, between the signal line and the second ground line.

12. An optical modulation apparatus comprising:
the optical device of claim 1; and
a frequency signal source that supplies the signal line with a frequency signal having a predetermined frequency.

13. The optical device of claim 1, wherein
the auxiliary electrodes are formed in contact with the dielectric film and within the insulating film.

14. The optical device of claim 1, wherein
the signal line, the first ground line and the second ground line are formed on a surface of the insulating film opposite to a surface contacting the dielectric film.

15. The optical device of claim 1, wherein
the first optical waveguide is arranged in contact with the insulating film and between the auxiliary electrode arranged in the first region and the signal line, and the second optical waveguide is arranged in contact with the insulating film and between the auxiliary electrode arranged in the second region and the signal line.

16. The optical device of claim 1, wherein
the insulating film has a dielectric constant lower than that of the dielectric film, and the substrate has a dielectric constant lower than that of the dielectric film.

* * * * *